US010872206B2

(12) United States Patent
Snyder et al.

(10) Patent No.: US 10,872,206 B2
(45) Date of Patent: Dec. 22, 2020

(54) SYSTEM AND FRAMEWORK FOR DYNAMIC REGULATORY CHANGE MANAGEMENT

(71) Applicant: Bank of America Corporation, Charlotte, NC (US)

(72) Inventors: Richard Allen Snyder, Charlotte, NC (US); Kristi Lynn Wetmore, Fort Mill, SC (US); Sarah MacKenzie Beatty, Charlotte, NC (US); Jennifer Robin Asaro, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 80 days.

(21) Appl. No.: 16/208,070

(22) Filed: Dec. 3, 2018

(65) Prior Publication Data
US 2020/0175110 A1    Jun. 4, 2020

(51) Int. Cl.
*G06F 40/289* (2020.01)
*G06N 20/00* (2019.01)
*G06Q 10/10* (2012.01)
*G06Q 50/18* (2012.01)

(52) U.S. Cl.
CPC .......... *G06F 40/289* (2020.01); *G06N 20/00* (2019.01); *G06Q 10/10* (2013.01); *G06Q 50/18* (2013.01)

(58) Field of Classification Search
CPC ...... G06F 40/289; G06N 20/00; G06Q 10/10; G06Q 50/18
USPC .......................................................... 704/9
See application file for complete search history.

(56) References Cited

U.S. PATENT DOCUMENTS

| | | |
|---|---|---|
| 1,033,167 A | 7/1912 | Greenfield |
| 7,818,176 B2 | 10/2010 | Freeman et al. |
| 8,073,681 B2 | 12/2011 | Baldwin et al. |
| 8,140,335 B2 | 3/2012 | Kennewick et al. |
| 8,326,637 B2 | 12/2012 | Baldwin et al. |
| 8,600,986 B2 | 12/2013 | Fan et al. |
| 8,943,051 B2 | 1/2015 | Fan et al. |
| 9,305,548 B2 | 4/2016 | Kennewick et al. |
| 9,336,306 B2 | 5/2016 | McAteer et al. |
| 9,336,485 B2 | 5/2016 | Haggar et al. |
| 9,348,900 B2 | 5/2016 | Alkov et al. |
| 9,626,703 B2 | 4/2017 | Kennewick, Sr. |

(Continued)

*Primary Examiner* — Pierre Louis Desir
*Assistant Examiner* — Nicole E Kotulak
(74) *Attorney, Agent, or Firm* — Michael A. Springs; Moore & Van Allen PLLC; Nicholas C. Russell

(57) ABSTRACT

Embodiments of the present invention provide a system for dynamic regulatory change management for an enterprise. The system continuously monitors multiple regulatory data sources to identify regulatory change management documentation. The system then scans descriptive fields within each identified regulatory change documentation for coverage area indicator terms and phrases. A machine learning system then determines an impact value for each identified regulatory change documentation for one or more regulatory inventories of the enterprise by analyzing the coverage area indicator terms and phrases. If the impact value is above a predetermined threshold, the system alerts a user dashboard associated with a particular regulatory inventory to the regulatory change documentation. If the impact value is below the predetermined threshold, the system tags the regulatory change documentation as not being relevant to the regulatory inventory.

20 Claims, 11 Drawing Sheets

(56) References Cited

U.S. PATENT DOCUMENTS

| | | |
|---|---|---|
| 9,684,876 B2 | 6/2017 | Agarwalla et al. |
| 9,824,364 B2 | 11/2017 | Galligan et al. |
| 9,898,459 B2 | 2/2018 | Tang |
| 9,910,886 B2 | 3/2018 | Adams, Jr. et al. |
| 9,946,763 B2 | 4/2018 | Barborak et al. |
| 10,431,214 B2 | 10/2019 | Guo et al. |
| 10,528,878 B2 | 1/2020 | Bruno et al. |
| 10,540,442 B2 | 1/2020 | Beller et al. |
| 10,614,799 B2 | 4/2020 | Kennewick, Jr. et al. |
| 10,628,738 B2 | 4/2020 | Sen et al. |
| 2007/0271299 A1* | 11/2007 | Wang ............... G06Q 50/02 |
| 2009/0241165 A1* | 9/2009 | Tyree ............... G06F 21/10 726/1 |
| 2013/0246291 A1* | 9/2013 | Dick ............... G06Q 10/00 705/317 |
| 2014/0258286 A1 | 9/2014 | Brown et al. |
| 2016/0189046 A1 | 6/2016 | Byron et al. |
| 2016/0203494 A1* | 7/2016 | Galligan Davila .. G06Q 30/018 705/317 |
| 2017/0124479 A1 | 5/2017 | Baughman et al. |
| 2018/0075554 A1* | 3/2018 | Clark ............... G06N 5/045 |
| 2020/0090059 A1* | 3/2020 | Kim ............... G06N 5/022 |

* cited by examiner

Regulatory Inventory and Regulatory Change Management User Interface — 601

Available Inventories
- Line of Business 1
- Line of Business 2
- Line of Business 6
- Line of Business 4

610

Selected Inventories
- Line of Business 6

620

Compliance Status — 630

| Inventory Classification | On Target to Meet Deadline | Deadline in Jeopardy | Deadline Has Been or Will Be Missed | TBD / Unknown |
|---|---|---|---|---|
| High | XXXX | XXXX | XXXX | XXXX |
| Medium | XXXX | XXXX | XXXX | XXXX |
| Low | XXXX | XXXX | XXXX | XXXX |
| Assessment Pending | XXXX | XXXX | XXXX | XXXX |
| Reassess | XXXX | XXXX | XXXX | XXXX |
| Total | XXXX | XXXX | XXXX | XXXX |

(All — 631; 632)

Responses Pending Assessment — 640

| Response ID | Reg Chg ID | Title | Issuing Authority | Citation | Assessment Due Date | Days Until Assessment Due Date | Issue Date |
|---|---|---|---|---|---|---|---|
| XXXX | YYYY | Title 1 | Authority 1 | ZZZZ | DD/MM/YYYY | XX days | DD/MM/YYYY |
| XXXX | YYYY | Title 2 | Authority 2 | ZZZZ | DD/MM/YYYY | XX days | DD/MM/YYYY |
| XXXX | YYYY | Title 3 | Authority 2 | ZZZZ | DD/MM/YYYY | XX days | DD/MM/YYYY |

*Figure 6*

Regulatory Inventory Tool
701

Home | Administrator | Help | Contact ◄——— 703

Inventory: [Line of Business 3 ▼] ———► 710

▲—— 700

Line of Business 3 ◄——— 702

Inventory Table
720

| Citation ▼ | Standard Name ▼ | Action Plans ▼ | Issuing Authority ▼ |
|---|---|---|---|
| AAAA | Regulation Name 1 | Action Plan 1 | Authority 1 |
| BBBB | Regulation Name 2 | Action Plan 2 | Authority 1 |
| CCCC | Regulation Name 3 | Action Plan 3 | Authority 2 |
| DDDD | Statute Name 1 | Action Plan 4 | Authority 3 |
| EEEE | Statute Name 2 | Action Plan 5 | Authority 4 |
| FFFF | Rule Name 1 | Action Plan 6 | Authority 5 |
| GGGG | Rule Name 2 | Action Plan 7 | Authority 5 |

Regulatory Change Table
730

| Citation ▼ | Standard Name ▼ | Issuing Authority ▼ | Affected Inventories ▼ | Description ▼ | Effective Date ▼ |
|---|---|---|---|---|---|
| HHHH | Regulation Name 4 | Authority 1 | Line of Business 3 | ---- | DD/MM/YYYY |
| IIII | Statute Name 3 | Authority 6 | Line of Business 3, Line of Business 6 | ---- | DD/MM/YYYY |
| JJJJ | Rule Name 3 | Authority 7 | Line of Business 1, Line of Business 3 | ---- | DD/MM/YYYY |

*Figure 7*

Regulatory Change User Interface 801

Home | Administrator | Regulatory Change | Action Steps | Help | Contact ← 803

Regulatory Change XXXX ← 802

Regulatory Change Overview 810

| | |
|---|---|
| Short Title | ZZZZ |
| Short Title Native Translation | ZZZZ |
| Regulatory Change ID # | XXXX |
| Applicable to Enterprise? | Yes |

| Region Affected | Issuing Authority | Type of Issuance | Rule Citation | Standard Name | Native Language Name |
|---|---|---|---|---|---|
| Region 1 | Authority 1 | Final Rule | HHHH | ZZZZ | ZZZZ |

Regulatory Change Window 820

| Responses | Details | Impacts | Related Reg Chgs | Reg Chg History |

| | |
|---|---|
| Description: | XXXXX XXXX XXXXX XXXXXX XX XXXXX XXX XXXX X XX<br>XXX XXXXX XX XXXXXX XXXXX XXX XXXXX XXXXX<br>XXX XXXXX XX XXXXXXXX XX XX X XXXXX XXXXX. |
| Description Native Translation: | n/a |
| Docket Number: | XXXX |
| Citation: | HHHH |
| Enterprise Issuance Category: | Final |
| English Translation?: | No |
| Joint Issuance?: | No |

Regulatory Change User Interface 801

Home | Administrator | Regulatory Change | Action Steps | Help | Contact ← 803

Regulatory Change XXXX ← 802

Regulatory Change Overview 810

| | |
|---|---|
| Short Title | ZZZZ |
| Short Title Native Translation | ZZZ |
| Regulatory Change ID # | XXXX |
| Applicable to Enterprise? | Yes |

| Region Affected | Issuing Authority | Type of Issuance | Rule Citation | Standard Name | Native Language Name |
|---|---|---|---|---|---|
| Region 1 | Authority 1 | Final Rule | HHHH | ZZZZ | ZZZZ |

Regulatory Change Window 820

| Responses | | Details | | Impacts | | Related Reg Chgs | Reg Chg History | | |
|---|---|---|---|---|---|---|---|---|---|
| Impact Rating | Compliance Status | | | Inventory | | Date Created | Ant. Comp. Date | Response ID | |
| High | On Target to Meet Deadline | | | Line of Business 1 | | DD/MM/YYYY | DD/MM/YYYY | AAAA | |
| High | On Target to Meet Deadline | | | Line of Business 1 | | DD/MM/YYYY | DD/MM/YYYY | BBBB | |
| Low | On Target to Meet Deadline | | | Line of Business 3 | | DD/MM/YYYY | DD/MM/YYYY | CCCC | |
| Medium | On Target to Meet Deadline | | | Line of Business 4 | | DD/MM/YYYY | DD/MM/YYYY | DDDD | |
| Medium | On Target to Meet Deadline | | | Line of Business 5 | | DD/MM/YYYY | DD/MM/YYYY | EEEE | |

Questionnaire Interface 901

Home | Administrator | Help | Contact ◄——— 903

Compliance Action Plan XXXX ◄——— 902

Impact Assessment Rating 910

Compliance Status 920

930

| 12 Unanswered Questions Remaining | 12 of 12 Questions Displayed | Select All "Yes" | Select All "No" ▼ —— 931 | | | | |
|---|---|---|---|---|---|---|
| Framework Element | Question | Impact? | Related Data | Add Data | Selected Data | |
| Strategic Plan | Does a Strategic Plan need to be updated or created because of this regulatory change? | ○ Yes ○ No | N/A | N/A | N/A | Add Comment | Add Action Step |
| Regulatory Inventory | Does the Reg. Inventory need to be updated? | ○ Yes ○ No | XXXX | N/A | XXXX | Add Comment | Add Action Step |
| Policy | Does a Policy need to be updated? | ○ Yes ○ No | XXXX | Add | XXXX | Add Comment | Add Action Step |
| Monitoring | Does a Monitoring activity need to be updated or created? | ○ Yes ○ No | XXXX | Add | XXXX | Add Comment | Add Action Step |
| Testing | Does a Testing Activity need to be updated or created? | ○ Yes ○ No | XXXX | Add | XXXX | Add Comment | Add Action Step |

SYSTEM AND FRAMEWORK FOR DYNAMIC REGULATORY CHANGE MANAGEMENT

BACKGROUND

Achieving and maintaining compliance with laws, rules, and regulations can be challenging for enterprises with multiple lines of business, especially when each line of business is governed by different rules and those rules are subject to change. Manually parsing through changes to regulations is resource intensive, and may result in analysis of laws, rules, and regulations that are not applicable to every line of business. As such, a need exists to automatically parse regulatory change documentation to identify coverage area indicator terms and phrases and to accurately report regulatory change documentation that affects certain lines of business.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for dynamic regulatory change management. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve continuously monitoring a plurality of regulatory data sources to identify regulatory change documentation. The regulatory data sources may comprise one or more electronic data feeds that monitor issuing authorities, and/or public information space systems that include regulatory information. Next, the system may scan descriptive fields within each identified regulatory change documentation for coverage area indicator terms and phrases.

The system can then cause a machine learning system to determine an impact value of each identified regulatory change documentation for one or more regulatory inventories of the enterprise by analyzing the coverage area indicator terms and phrases within each regulatory change documentation. Analyzing the coverage area indicator terms and phrases within each regulatory change documentation can be conducted based on underlying sub-impact values of individual words, characters, numbers, phrases, or the like. For example, the machine learning system may determine sub-impact values of individual coverage area indicator terms and phrases within each regulatory change documentation. These underlying values may comprise sub-impact values of proximity levels between two or more specific coverage area indicator terms and phrases within each regulatory change documentation. Additionally or alternatively, the underlying values may comprise sub-impact values of grammatical relationships between two or more specific coverage area indicator terms and phrases. Furthermore, the underlying values may comprise sub-impact values of time-based information associated with the identified regulatory change documentation.

In response to determining that an impact value of a first regulatory change documentation for a first regulatory inventory meets or exceeds a predetermined threshold, the system may cause a user dashboard associated with the first regulatory inventory to display a regulatory change alert for the first regulatory change documentation. The displayed regulatory change alert may comprise at least one of the impact value of the first regulatory change documentation, the first regulatory change documentation, the individual regulatory coverage area indicator terms and phrases within the first regulatory change documentation, the sub-impact values of individual coverage area indicator terms and phrases within each regulatory change documentation, and/or certain time-based information associated with the identified regulatory change documentation.

Alternatively, in response to determining that the impact value of the first regulatory change documentation for the first regulatory inventory is below the predetermined threshold, the system may tag the first regulatory change documentation as not being materially relevant to the first regulatory inventory.

The machine learning system may be trained and improved through deep learning processes, where the strength and accuracy of sub-impact values within regulatory change documentation honed to be more accurate to protect against false negatives (i.e., tagging a regulatory change documentation as not being materially relevant to a regulatory inventory when it should have been reported to the regulatory inventory) but to also cut down on false positives (i.e., reporting a regulatory change documentation as being materially relevant to a regulatory inventory when the documentation was not materially relevant). As such, the machine learning system may determine and dynamically update sub-impact values of (1) individual coverage area indicator terms and phrases, (2) proximity levels between two or more specific coverage area indicator terms and phrases, (3) grammatical relationships between two or more specific coverage area indicator terms and phrases, and (4) time-based information, based on a machine learning analysis of a continuously updated historical regulatory change database comprising previously received regulatory change documentation and user-verified determinations as to whether the previously received regulatory change documentation was materially relevant to one or more regulatory inventories.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
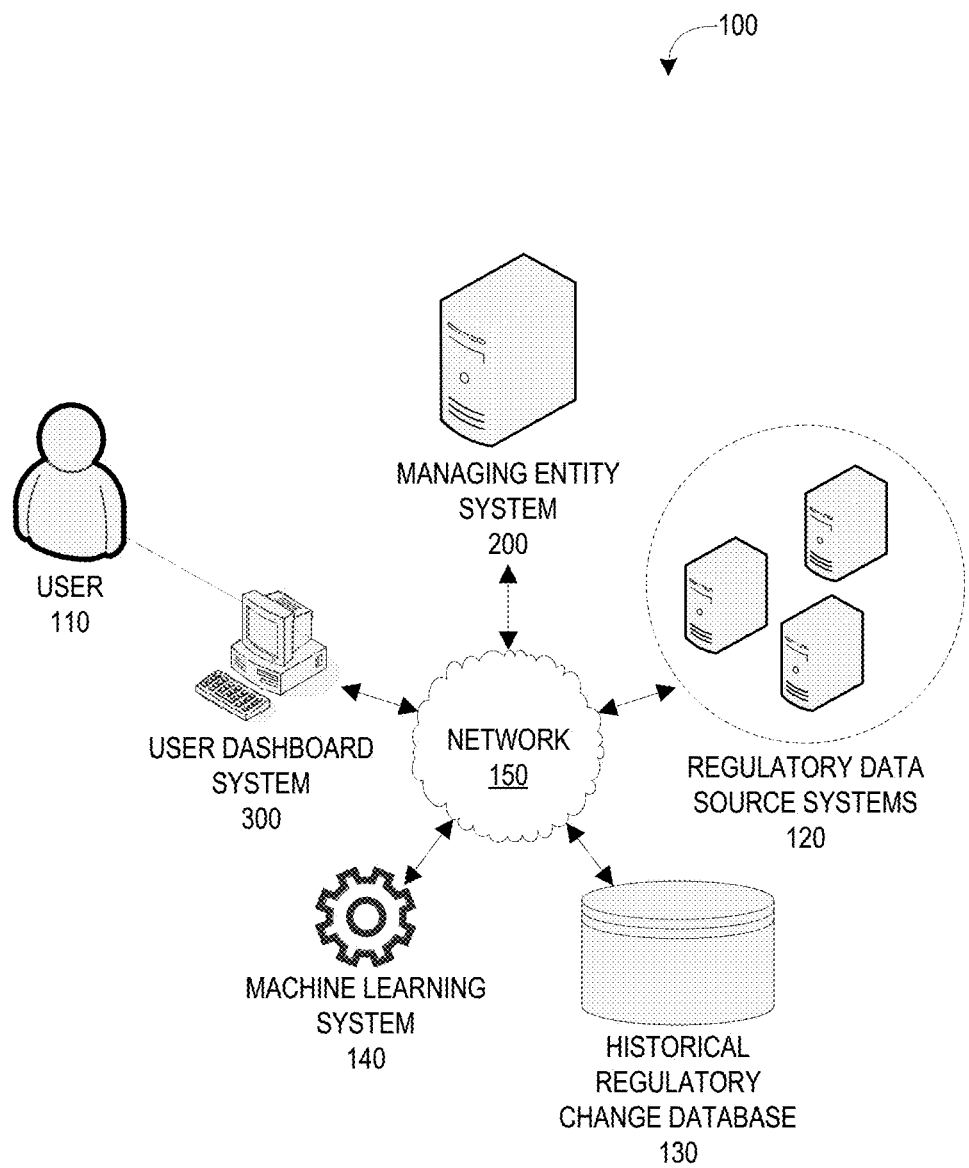
Figure 2:
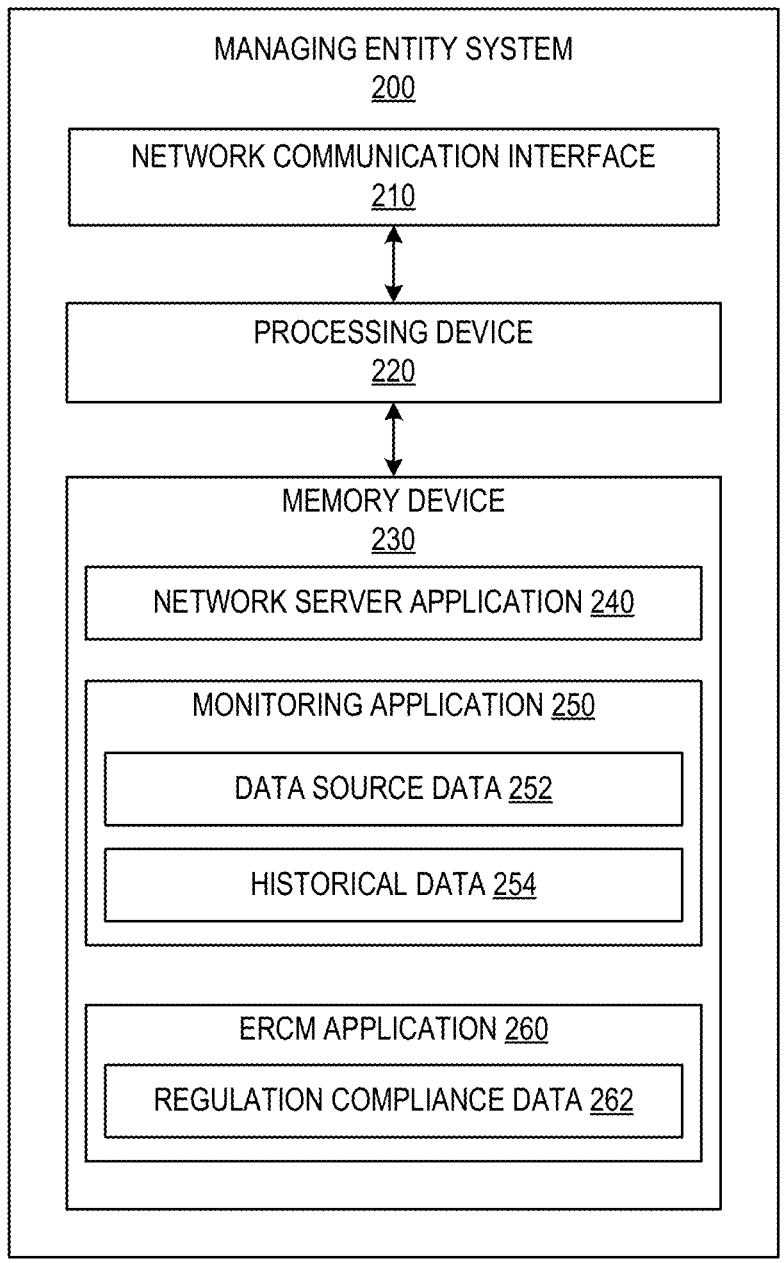
Figure 3:
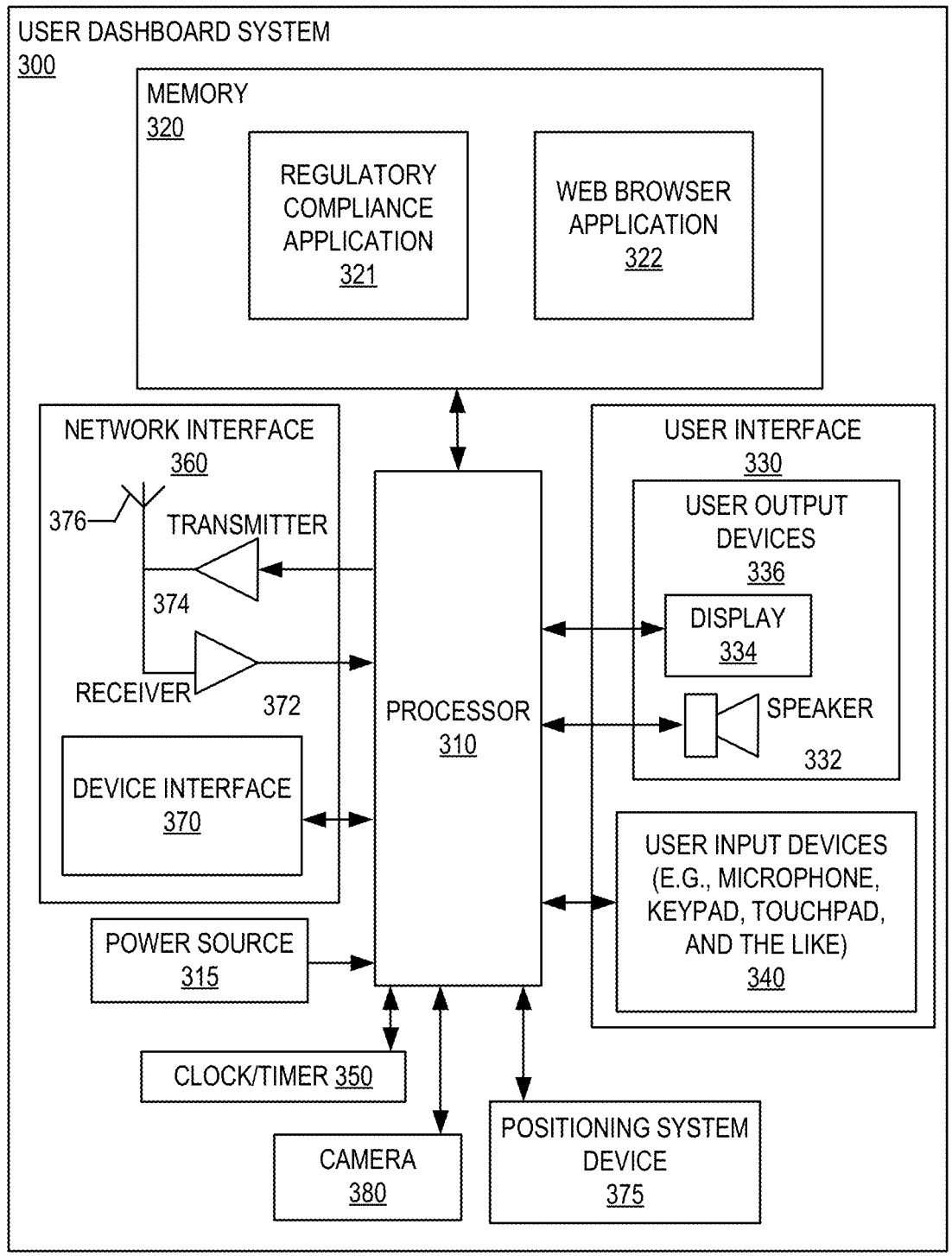
Figure 4:
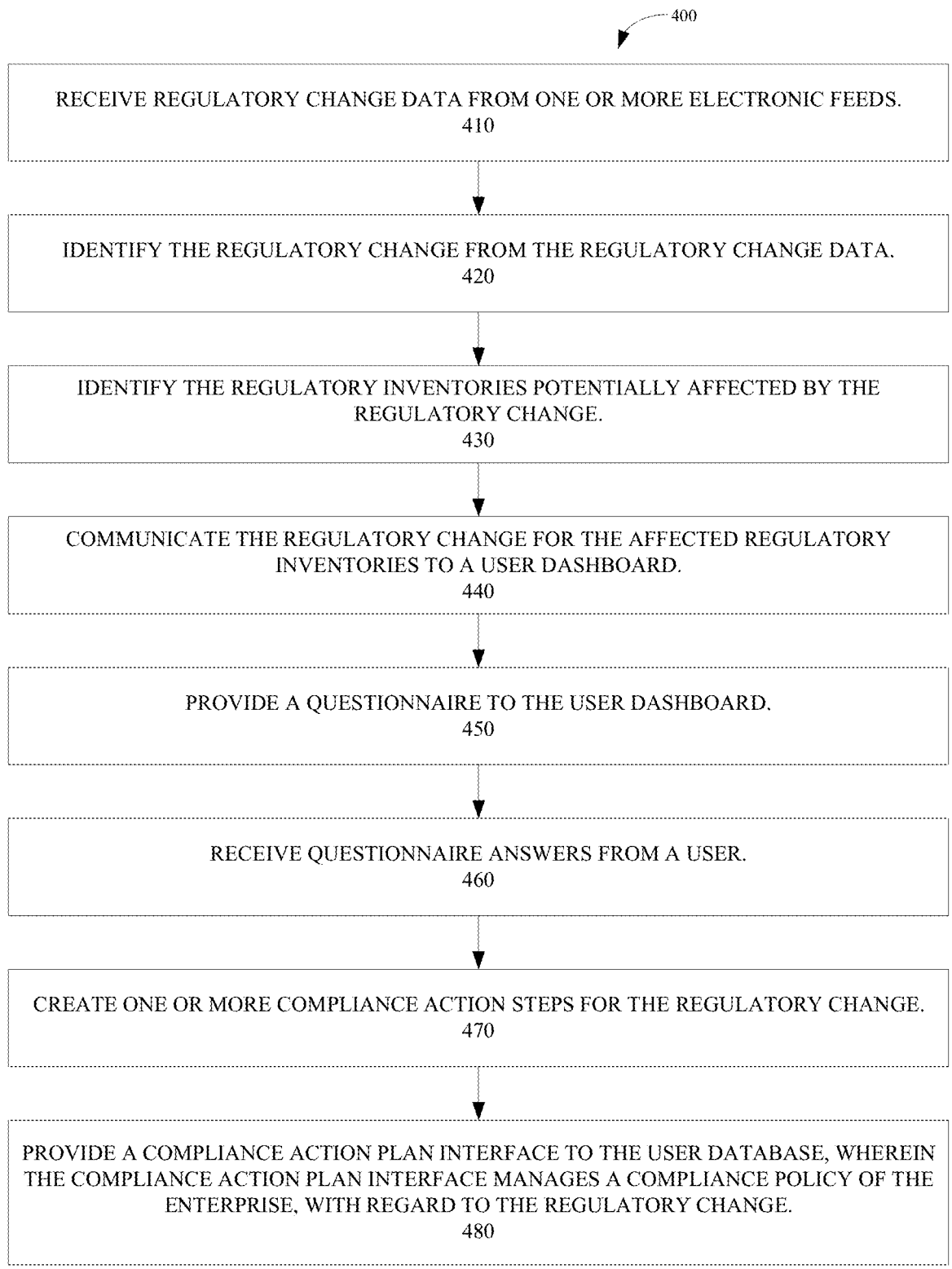
Figure 5:
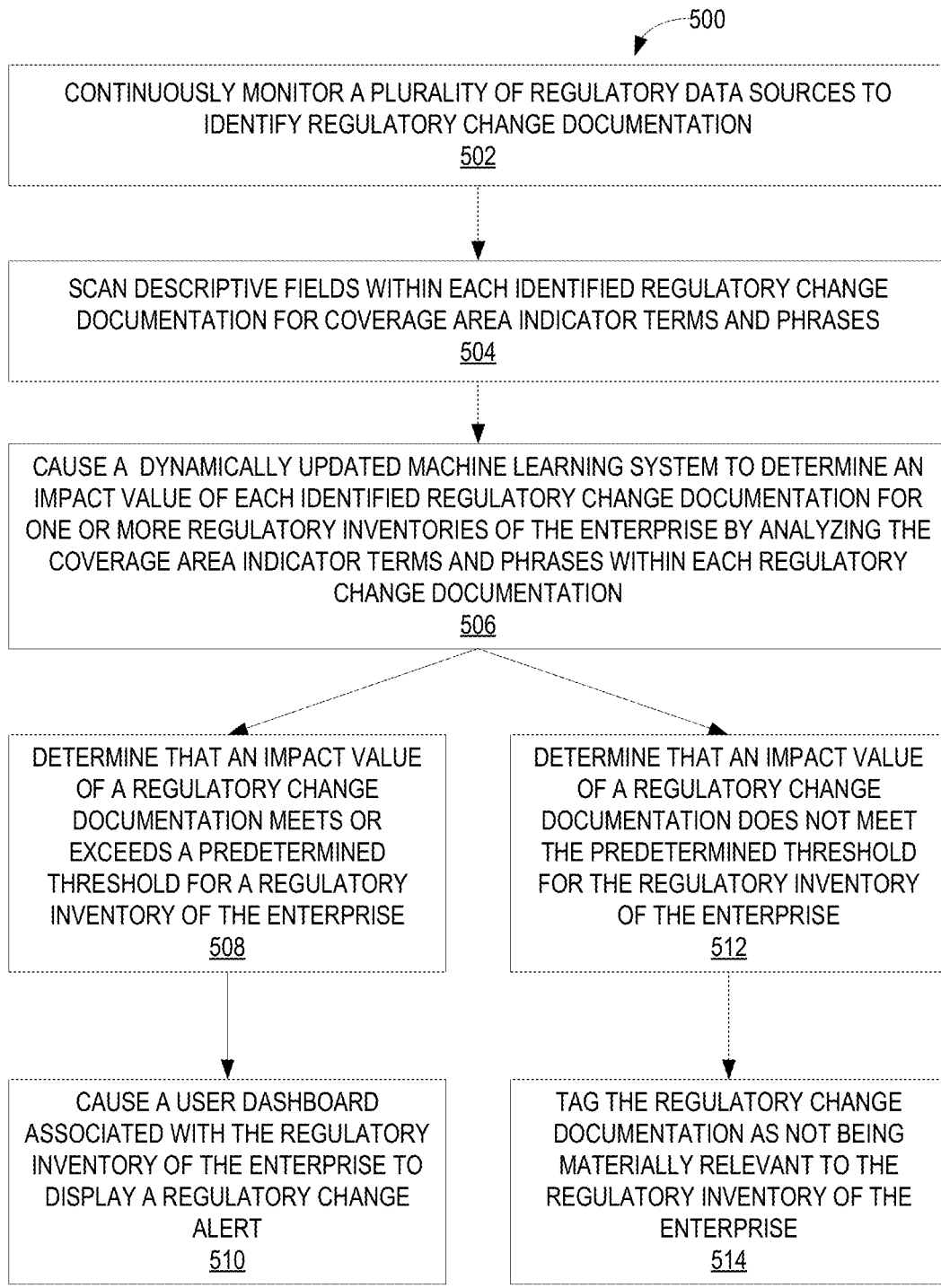
Figure 10:
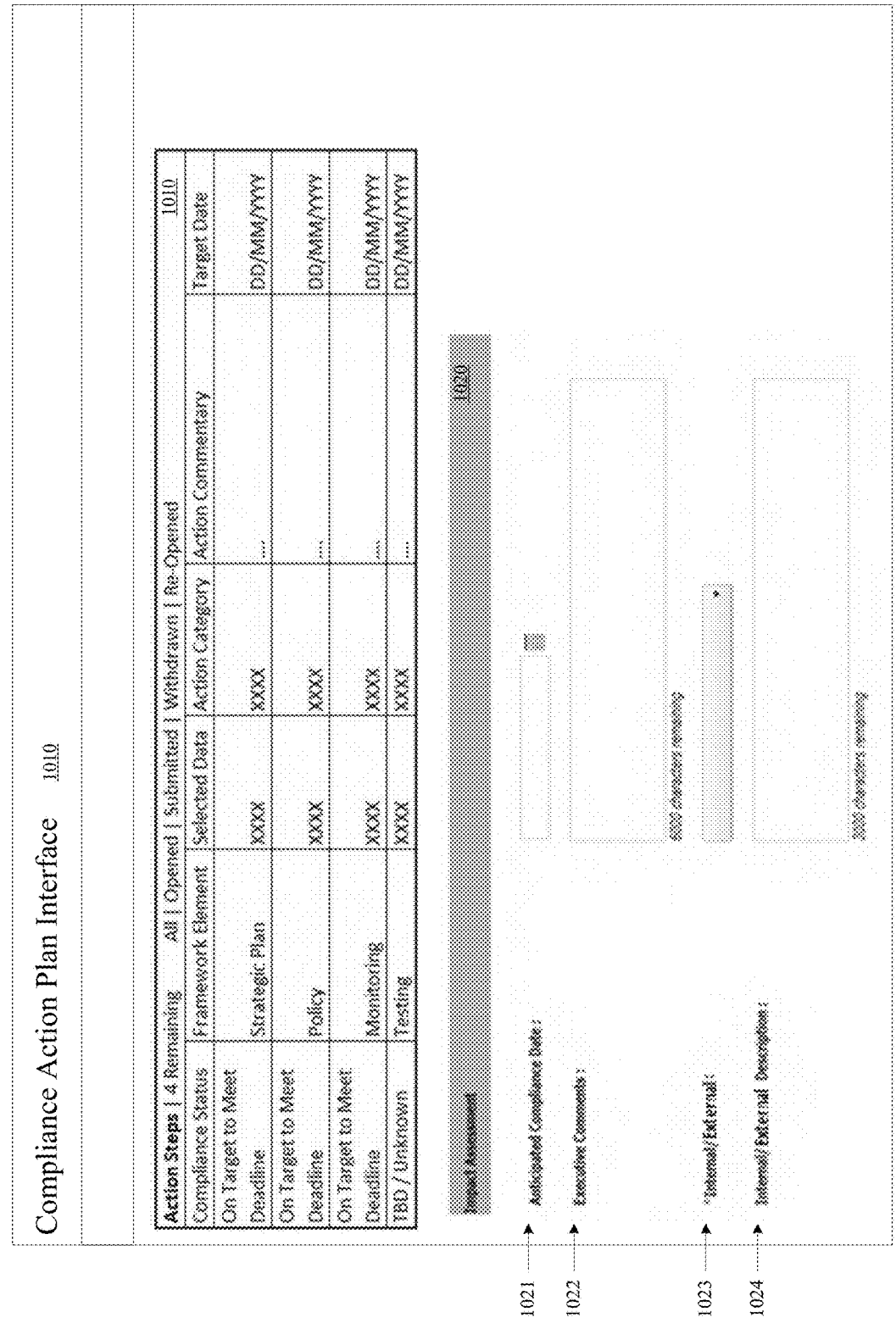

Having thus described an embodiment of the invention in general terms, reference will now be made the accompanying drawings, wherein:

FIG. 1 is a block diagram illustrating a system and framework for dynamic regulatory change management, in accordance with an embodiment of the invention;

FIG. 2 illustrates the managing entity system of the system and framework for dynamic regulatory change management, in accordance with an embodiment of the invention;

FIG. 3 illustrates the user dashboard system of the system and framework for dynamic regulatory change management, in accordance with an embodiment of the invention;

FIG. 4 is a flowchart illustrating an enterprise regulatory inventory and regulatory change management system, in accordance with an embodiment of the invention;

FIG. 5 provides a flowchart that illustrates a system for dynamic regulatory change management, in accordance with an embodiment of the present invention;

FIG. 6 is a sample display illustrating a user interface homepage, in accordance with an embodiment of the present invention;

FIG. 7 is a sample display illustrating a regulatory inventory tool, in accordance with an embodiment of the invention;

FIG. 8A is a sample display illustrating a regulatory change user interface, in accordance with an embodiment of the invention;

FIG. 8B is a sample display illustrating a regulatory change user interface, in accordance with an embodiment of the invention;

FIG. 9 is a sample display illustrating a questionnaire interface, in accordance with an embodiment of the invention; and FIG. 10 is a sample display illustrating a compliance action plan interface, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in one or more software modules (also referred to herein as computer-readable code portions) executed by a processor or processing device and configured for performing certain functions, or in a combination of the two. A software module may reside in RAM memory, flash memory, ROM memory, EPROM memory, EEPROM memory, registers, a hard disk, a removable disk, a CD-ROM, or any other form of non-transitory storage medium known in the art. An exemplary storage medium may be coupled to the processing device, such that the processing device can read information from, and write information to, the storage medium. In the alternative, the storage medium may be integral to the processing device. Further, in some embodiments, the processing device and the storage medium may reside in an Application Specific Integrated Circuit (ASIC). In the alternative, the processing device and the storage medium may reside as discrete components in a computing device. Additionally, in some embodiments, the events and/or actions of a method or algorithm may reside as one or any combination or set of codes or code portions and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions, code, or code portions on a computer-readable medium. Computer-readable media includes both non-transitory computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

In some embodiments, an "enterprise" may refer to a business entity that is either operating within, or acting on behalf of an enterprise operating within, a regulatory environment and therefore requires regulatory change management to maintain compliance with the regulations. In some embodiments, an enterprise may be comprised of more than one line of business, with each line of business falling under different regulatory schemes and restrictions. For example, in exemplary embodiments, an enterprise may be a financial institution, or one or more parties within the financial institution. For the purposes of this invention, a "financial institution" may be defined as any organization, entity, or the like in the business of moving, investing, or lending money, dealing in financial instruments, or providing financial services. This may include commercial banks, thrifts, federal and savings banks, savings and loan associations, credit unions, investment companies, insurance companies and the like. In some embodiments, the financial institution may be comprised of several different lines of business, each with distinct regulatory restrictions. As such, each line of business requires unique regulatory compliance review, and the current invention can provide such comprehensive regulatory compliance management.

FIG. 1 provides a block diagram illustrating a system environment 100 for dynamic regulatory change management for an enterprise, in accordance with an embodiment of the invention. As illustrated in FIG. 1, the system environment 100 includes a managing entity system 200, a user dashboard system 300, regulatory data source systems 120, an historical regulatory change database 130, and a machine learning system 140. The user dashboard system 300 may be associated with one or more users 110 that are employees of the managing entity associated with the managing entity system 200, and which are specialists associated with regulatory change management.

The managing entity system 200, the user dashboard system 300, the regulatory data source systems 120, the historical regulatory change database 130, and the machine learning system 140 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The managing entity system 200 may be a system owned or otherwise controlled by a managing entity to perform one or more process steps described herein. In some embodiments, the managing entity is a financial institution. In general, the managing entity system 200 is configured to communicate information or instructions with the user dashboard system 300, the regulatory data source systems 120, the historical regulatory change database 130, and/or the machine learning system 140 across the network 150. As such, the managing entity system 200 may be configured to perform (or instruct other systems to perform) one or more other process steps described herein. The managing entity system 200 is described in more detail with respect to FIG. 2.

The user dashboard system 300 may be a system owned or controlled by the managing entity and/or a third party that specializes in alerting, notifying, displaying, or otherwise informing users 110 about regulatory change information. As such, the user dashboard system 300 may be configured to perform (or instruct other systems to perform) one or more other process steps described herein. The user dashboard system 300 is described in more detail with respect to FIG. 3, and examples and descriptions of user interface 330 displays for the user dashboard system 300 are provided with respect to FIGS. 6-10.

The regulatory data source systems 120 may comprise data feeds, online databases, remote databases, third party databases, third party data feeds, or online information websites that are accessible to and/or in connection with the managing entity system 200, the historical regulatory change database 130, and/or the machine learning system 140.

The historical regulatory change database 130 comprises a data repository for regulatory change documentations that have been received, tags or other characterizations that have been associated with those regulatory change documentation, and may include additional rules or information associated with actions taken with respect to those regulatory change documentation.

The machine learning system 140 may comprise a network communication interface, a processing device, and one or more memory devices, where the processing device are configured to perform certain actions with the memory devices and communicate these actions to the managing entity system 200, the user dashboard system 300, the regulatory data source systems 120, and/or the historical regulatory change database 130 across the network 150. The machine learning system 120 may include a knowledge base (e.g., the historical regulatory change database 130), a set of dynamic directed graph analysis rules (e.g., rules based on a learning classifier system, rules based on an association rule learning system, or the like), and any other sets of data, rules, guidelines, boundaries, and any other information that can be utilized to analyze a dynamic directed graph as described herein.

As such, the machine learning system 140 may be configured to analyze regulatory change documentation received from the regulatory data source systems 120, make determinations regarding impact values and/or sub-impact values of the regulatory change documentation, and return the calculations or determinations (i.e., the analysis) to the managing entity system 200 and/or the user dashboard system 300.

This machine learning system 120 may comprise a deep learning system like a deep neural network-based system in addition to other machine learning functions like decision trees and regression techniques. In some embodiments, this deep neural network may comprise 3, 4, or more layers, and may comprise one or more of an autoencoder, a multilayer perceptron ("MLP") a recurrent neural network ("RNN"), a convolutional deep neural network ("CNN"), a Boltzmann machine, and the like. The machine learning system may utilize natural language processing to establish the rules and determinations described herein.

FIG. 2 provides a block diagram illustrating the managing entity system 200, in greater detail, in accordance with embodiments of the invention. As illustrated in FIG. 2, in one embodiment of the invention, the managing entity system 200 includes one or more processing devices 220 operatively coupled to a network communication interface 210 and a memory device 230. In certain embodiments, the managing entity system 200 is operated by a first entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, a monitoring application 250 which includes data source data 252 (e.g., from the regulatory data source systems 120 of FIG. 1) and historical data 254 (e.g., from the historical regulatory change database 130 of FIG. 1), an enterprise regulatory change management ("ERCM") application 260 which includes regulation compliance data 262, and other computer-executable instructions or other data. The computer-executable program code of the network server application 240, the monitoring application 250, and/or the ERCM application 260 may instruct the processing device 220 to perform certain logic, data-processing, and data-storing functions of the managing entity system 200 described herein, as well as communication functions of the managing entity system 200.

The network server application 240, the monitoring application 250, and/or the ERCM application 260 are configured to invoke or use the data source data 252, the historical data 254, the regulation compliance data 262, and the like when communicating through the network communication interface 210 with the user dashboard system 300, the regulatory data source systems 120, the historical regulatory change database 130, and/or the machine learning system 140.

FIG. 3 provides a block diagram illustrating a user dashboard system 300 of FIG. 1 in more detail, in accordance with embodiments of the invention. In one embodiment of the invention, the user dashboard system 300 is a workstation of the enterprise. However, it should be understood that a mobile telephone is merely illustrative of one type of user dashboard system 300 that may benefit from, employ, or otherwise be involved with embodiments of the present invention and, therefore, should not be taken to limit the scope of embodiments of the present invention. Other types of user dashboards may include mobile phones, portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the user dashboard system 300 include a processor 310 communicably coupled to such devices as a memory 320, user output devices 336, user input devices 340, a network interface 360, a power source 315, a clock or other timer 350, a camera 380, and a positioning system device 375. The processor 310, and other processors described herein, generally include circuitry for implementing communication and/or logic functions of the user dashboard system 300. For example, the processor 310 may include a digital signal processor device, a microprocessor device, and various analog to digital converters, digital to analog converters, and/or other support circuits. Control and signal processing functions of the user dashboard system 300 are allocated between these devices according to their respective capabilities. The processor 310 thus may also include the functionality to encode and interleave messages and data prior to modulation and transmission. The processor 310 can additionally include an internal data modem. Further, the processor 310 may include functionality to operate one or more software programs, which may be stored in the memory 320. For example, the processor 310 may be capable of operating a connectivity program, such as a web browser application 322. The web browser application 322 may then allow the user dashboard system 300 to transmit and receive web content, such as, for example, location-based content and/or other web page content, according to a Wireless Application Protocol (WAP), Hypertext Transfer Protocol (HTTP), and/or the like.

The processor 310 is configured to use the network interface 360 to communicate with one or more other devices on the network 150. In this regard, the network interface 360 includes an antenna 376 operatively coupled to a transmitter 374 and a receiver 372 (together a "transceiver"). The processor 310 is configured to provide signals to and receive signals from the transmitter 374 and receiver 372, respectively. The signals may include signaling information in accordance with the air interface standard of the applicable cellular system of the wireless network 150. In this regard, the user dashboard system 300 may be configured to operate with one or more air interface standards, communication protocols, modulation types, and access types. By way of illustration, the user dashboard system 300 may be configured to operate in accordance with any of a number of first, second, third, and/or fourth-generation communication protocols and/or the like. For example, the user dashboard system 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The user dashboard system 300 may also be configured to operate in accordance with non-cellular communication mechanisms, such as via a wireless local area network (WLAN) or other communication/data networks.

As described above, the user dashboard system 300 has a user interface 330 that is, like other user interfaces described herein, made up of user output devices 336 and/or user input devices 340. The user output devices 336 include a display 334 (e.g., a liquid crystal display or the like) and a speaker 332 or other audio device, which are operatively coupled to the processor 310.

The user input devices 340, which allow the user dashboard system 300 to receive data from a user such as the user 110, may include any of a number of devices allowing the user dashboard system 300 to receive data from the user 110, such as a keypad, keyboard, touch-screen, touchpad, microphone, mouse, joystick, other pointer device, button, soft key, and/or other input device(s). The user interface 330 may also include a camera 380, such as a digital camera.

The user dashboard system 300 may also include a positioning system device 375 that is configured to be used by a positioning system to determine a location of the user dashboard system 300. For example, the positioning system device 375 may include a GPS transceiver. In some embodiments, the positioning system device 375 is at least partially made up of the antenna 376, transmitter 374, and receiver 372 described above. For example, in one embodiment, triangulation of cellular signals may be used to identify the approximate or exact geographical location of the user dashboard system 300. In other embodiments, the positioning system device 375 includes a proximity sensor or transmitter, such as an RFID tag, that can sense or be sensed by devices known to be located proximate a merchant or other location to determine that the user dashboard system 300 is located proximate these known devices.

The user dashboard system 300 further includes a power source 315, such as a battery, for powering various circuits and other devices that are used to operate the user dashboard system 300. Embodiments of the user dashboard system 300 may also include a clock or other timer 350 configured to determine and, in some cases, communicate actual or relative time to the processor 310 or one or more other devices.

The user dashboard system 300 also includes a memory 320 operatively coupled to the processor 310. As used herein, memory includes any computer readable medium (as defined herein below) configured to store data, code, or other information. The memory 320 may include volatile memory, such as volatile Random Access Memory (RAM) including a cache area for the temporary storage of data. The memory 320 may also include non-volatile memory, which can be embedded and/or may be removable. The non-volatile memory can additionally or alternatively include an electrically erasable programmable read-only memory (EEPROM), flash memory or the like.

The memory 320 can store any of a number of applications which comprise computer-executable instructions/code executed by the processor 310 to implement the functions of the user dashboard system 300 and/or one or more of the process/method steps described herein. For example, the memory 320 may include such applications as a conventional web browser application 322 and/or a regulatory compliance application 321 (or any other application provided by the managing entity system 200). These applications also typically instructions to a graphical user interface (GUI) on the display 336 that allows the user 110 to interact with the user dashboard system 300, the managing entity system 200, and/or other devices or systems. In other embodiments of the invention, the user 110 interacts with the managing entity system 200 via the web browser application 322 in addition to, or instead of, the regulatory compliance application 321.

The memory 320 can also store any of a number of pieces of information, and data, used by the user dashboard system 300 and the applications and devices that make up the user dashboard system 300 or are in communication with the user dashboard system 300 to implement the functions of the user dashboard system 300 and/or the other systems described herein. The user dashboard system 300 may be configured to display the user interfaces described with respect to FIGS. 6-10.

FIG. 4 provides a simple process flow 400 illustrating a process 400 for identifying and addressing regulatory changes from regulatory change data. This process 400 can be improved with the specific techniques for identifying, analyzing, and quantifying coverage area indicator terms and phrases within regulatory change documentation provided with respect to the process 500 in FIG. 5. As illustrated by block 410 of FIG. 4, the system receives regulatory change data from one or more electronic feeds 120 wherein the electronic feeds monitor one or more issuing authorities. A feed may be one or more electronic data suppliers, in communication with the network 150. In some embodiments, a feed is an electronic database that monitors multiple regulatory issuing agencies for regulatory changes. When a regulatory change is discovered, the feed may pull the regulatory change data and communicate the regulatory change data to the network in real time or near-real time. In such an embodiment, the network 150 may receive the regulatory change data from an issuing authority, via the feed, in real time, or near-real time. This automatic nature of the system allows an enterprise to constantly update and maintain its regulatory inventories with the most up-to-date regulatory change data available. It also allows an enterprise to begin its analysis of a regulatory change and develop an appropriate compliance action plan to address the regulatory change at an earlier point in time than the enterprise could without the real time electronic data feed. The feed may be maintained by an entity that is separate from the enterprise. In some embodiments, multiple feeds provide data related to separate regions. For example, a first region feed may provide data related to Region 1, a fourth region feed may provide data related to Region 4, and a sixth region feed may provide data related to Region 6. In other embodiments, a single feed may provide data related to all regions. In some embodiments, the network 150 reaches out to the feed to communicate and receive data. In some embodiments, the feed and the network 150 are connected such that the feed automatically sends data to the network 150 on a continuous or periodic basis. For example, the feed may send data to the network 150 on a daily basis. In some embodiments, the feed is one or more electronic databases that store regulatory change data and the network 150 monitors the feed in real time, or near real time, for new regulatory change data. When the regulatory change data is discovered, the network 150 then pulls the regulatory change data from the feed and distributes the regulatory change data throughout the system. In some embodiments, the data communicated to the network 150 by the feed is regulatory change data. Regulatory change data is data containing or describing changes to existing laws, rules, regulations, as well as the identification of new laws, rules and regulations. In some embodiments, these laws, rules, and regulations may pertain to financial services, data security, contracts, employment, or specific lines of business within an enterprise. The regulatory change data may be created by an issuing authority. An issuing authority may be a rule maker, regulator, agency, body, organization, standard setter, or similarly responsible organization, including legal authorities, regional rule making bodies, and legal authorities or courts. In some embodiments, the issuing authority may provide a feed of regulatory change data directly to the network 150. In other embodiments, a third party, or external vendor, may collect the regulatory change data from one or more issuing authorities and then provide a feed containing the regulatory change data to the network 150.

As illustrated by block 420, the system then identifies the regulatory change. In some embodiments, more than one regulatory change has taken place and each change has been delivered to the network via the feed. In such an embodiment, the system identifies each regulatory change. Again, a regulatory change may be a change to existing laws, rules, and regulations or the identification of new laws, rules, and regulations. Identifying the regulatory change comprises determining the issuing authority, the rule citation, the standard name of the rule, the region affected by the rule, and the new or changed text of the rule. This determination may be completed using logical sequencing based on the taxonomy of feed data. For example, the feed may provide a dataset containing a rule citation that matches the taxonomy expected by the system. In such a case, the system registers that the regulatory change dataset is a rule from a specific source, and then the system can discern what the standard name of the rule is, who the issuing authority is, and what the new or changed language of the rule is. The enterprise may keep the rule citation taxonomy uniform throughout every line of business within the enterprise. In some embodiments, each line of business uses different rule citation taxonomies. In such embodiments, the system may match the regulatory change citation to the taxonomies of each individual line of business. By matching the regulatory change data citation taxonomy to the taxonomy of each individual line of business, the system allows a line of business to set up inventory classifications, described below, using the preferred taxonomy of that line of business. In some embodiments, a regulation change ID is assigned to each regulation change for referencing and maintenance purposes within the enterprise.

As illustrated by block 430, once the system has identified the regulatory change, the system then identifies the regulatory inventories potentially affected by the regulatory change. A regulatory inventory is an inventory of laws, rules, and regulations that may affect a particular line of business. Since one line of business within an enterprise may be subject to different laws, rules, and regulations than a different line of business within the same enterprise, each line of business may have its own specialized regulatory inventory. Because of these differences in compliance scope coverage, a unique inventory classification may be given to each line of business within the enterprise. An inventory classification may be a set of directives pertaining to which regulatory changes may be relevant to a specific regulatory inventory. These directives may be general instructions such as "regulatory changes involving Region 1" or "regulatory changes involving the XYZ Act." The directives may also be more specific instructions such as "regulatory changes to XX U.S.C. XXX(a)" or "regulatory changes containing the keyword XXXX." Of course, such directives may be more or less specific, and may be used in combination with one another.

The use of inventory classification and the process step 430 will be illustrated in the following example: The system has already identified the regulatory change to be concerning the statute YY U.S.C. ZZZ for Region 4. The enterprise includes a regulatory inventory for a first line of business, which contains an inventory classification of "regulatory changes involving Region 1 or statute YY U.S.C. WWW." The enterprise also includes a regulatory inventory for a second line of business, which contains an inventory classification of "regulatory changes involving Region 4 or statute YY U.S.C. VVV." Since the regulatory inventory for the second line of business has an inventory classification that covers regulatory changes involving Region 4, the system will identify the regulatory inventory for the second line of business as being affected by the current regulatory change.

The inventory classifications may be created by one or more users affiliated with the enterprise and having knowledge of the specific line of business associated with each regulatory inventory. In some embodiments of the invention, a regulatory inventory may be created for each line of business and a list of all relevant laws, rules, and regulations pertaining to the line of business are pre-populated into the regulatory inventory. In other embodiments, the regulatory inventory may originally be empty, and the regulatory inventory is only populated when the system identifies that regulatory inventory as being potentially affected by a new regulatory change, based on the inventory classification. Of course, the regulatory inventory and the inventory classification for each line of business may be changed at any point, so that an enterprise may keep up to date with any changes to the overall structure of the regulations or to include any new Acts, treaties, court cases, or the like.

By automatically filtering each regulatory change through inventory classifications, an enterprise may save significant time and resources in compliance management because each regulatory change is sent only to the lines of business most likely affected by the change. No time is wasted by human employees parsing through each new regulation to determine if it may affect their particular line of business. Instead, the employees are presented with a list of regulatory changes that match their pre-determined rules for relevance regarding their specific line of business, as discussed next.

As illustrated by block 440, the system then communicates the regulatory change for the affected regulatory inventory to a user dashboard system 300. The user dashboard system 300 may be accessed by a user 110 that has knowledge of the line of business affected by the regulatory change. In one embodiment where one regulatory change may impact more than one line of business within the enterprise, the system may communicate the regulatory change to more than one user dashboard, where each user dashboard is associated with a distinct line of business. In other embodiments where one regulatory change may impact more than one line of business, more than one user may access a single user dashboard system 300.

As illustrated by block 450, the system then provides a questionnaire to the user dashboard. This questionnaire may be pre-populated with questions directed to how the regulatory change may affect the line of business. This questionnaire step allows the system to further filter out irrelevant regulation changes, narrow down the impact a relevant regulation change will have on the line of business, and help to establish the action steps necessary to achieve or maintain compliance with the regulation change. The questionnaire may change between lines of business, but the task of each questionnaire is to ask a user 110 whether aspects of a line of business, such as processes, controls, policies, monitoring activities, testing activities, and the like, are affected by the regulatory change, and whether changes need to be made to those affected aspects. The questionnaire may also provide one or more sections that allow a user 110 to provide analysis or feedback regarding the regulatory change, so that other users or an administrator may have a better understanding of the regulatory change and potential issues that the regulatory change raises.

The system may pull information from the regulatory inventory or other databases within its network 150, including the Internet and any intranet, and communicate this information to the user dashboard system 300 so that the user 110 may have all necessary information available to assist in responding to the questionnaire.

In some embodiments of the invention, the questionnaire may provide selectable answers for each question. Questions may be simple "Yes/No" questions such as "Does Process 1 need to be updated because of this regulatory change?: Y/N." The questions may also allow for a "rating" response, such as "What is the Impact Assessment Rating?: High/Medium/Low." Some questions may include a dropdown list of pre-populated responses, selectable by the user 110. Some questions may provide a comment section for non-scripted responses by the user 110.

As illustrated by block 460, the system receives the user's 110 responses to the questionnaire. The responses may be stored within the data storage of the user dashboard system 300, or in the memory storage 230 of a server.

As illustrated by block 470, the system then creates a compliance action plan comprising one or more action steps for the regulatory change. The action steps are designed to aid the enterprise in its process of achieving or maintaining compliance with the regulatory change. An action step is a remedial task to be performed by an employee of the enterprise, or by an independent contractor, on behalf of the enterprise. Completing all of the action steps closes out the compliance action plan, and means that the regulatory change is accounted for within the line of business. Examples of action steps include "Create a new testing policy for System AAA to account for the regulatory change," "Adjust Policy BBB to account for the regulatory change." The action steps may be derived from the questionnaires discussed in blocks 450 and 460, so a strong set of action steps may depend on in-depth, detailed questions and responses to the questionnaire.

In some embodiments, the system automatically assigns an action step to an employee of the enterprise who normally takes on similar tasks. This assignment may be made based on job title, job description, work load, or any other pre-set assignment rule.

As illustrated in block 480, the system then provides an organized user interface at the user dashboard system 300 so that a user 110 and/or administrator may keep track of the compliance action plans and better manage the enterprise's compliance, with regard to each regulatory change. In some embodiments, the system creates all action steps within the action plan. In other embodiments, the system creates some, or none of the action steps for the action plan. In some embodiments, a user 110 may add or remove action steps to or from the action plan.

In some embodiments, the system may receive a notice from a user 110 that an action step is completed. In such an embodiment, the system may automatically close the action step so that the enterprise will know that no further action is necessary regarding that action step. Once all action steps are closed, the system may automatically close the compliance action plan, indicating that the enterprise is, or will become, compliant with the regulatory change.

Referring now to FIG. 5, a flowchart is provided to illustrate one embodiment of a process 500 for dynamic regulatory change management for an enterprise, in accordance with embodiments of the invention. In some embodiments, the process 500 may include block 502, where the system continuously monitors a plurality of regulatory data sources to identify regulatory change documentation. Continuously monitoring regulatory data sources can include receiving electronic feeds directly from the regulatory data sources, receiving electronic data feeds from third party aggregators of regulatory data, actively accessing regulatory databases that are remote to the managing entity, actively trawling public information space systems (e.g., websites associated with regulations), public electronic records and/or the like.

The system may monitor these regulatory data sources periodically and/or in real time to identify when changes to known regulations occur, to identify when new regulatory changes occur, to identify when a scope of a known regulation changes, and the like. As used herein, each item (or group of items) associated with a regulatory change is referred to as a regulatory change documentation. For example, a new regulation may be published by a regulatory agency and is transmitted via an electronic data feed to the managing entity as a text document containing the regulation terms and a regulation citation. Alternatively, an identified webpage that provides a regulatory change may be copied in webpage form and stored in a regulatory change database as a webpage document. In other embodiments, the system may copy at least a portion of the text present in the webpage and store this as the regulatory change documentation. The system may, in some embodiments, receive an image or pdf of a regulation or regulation change, where the text of the regulation and/or change in regulation is not easily searchable. In such embodiments, the system may implement an optical character recognition process on the image or pdf of the regulatory change documentation to make the regulatory change documentation searchable.

In some embodiments, the process 500 includes block 504, where the system scans descriptive fields within each identified regulatory change documentation for coverage area indicator terms and phrases. In some embodiments, the machine learning system described in block 506 performs this scanning step of block 504. While previous iterations of regulatory change management involved identifying a regulatory change citation template and extracting information based on that template, this step in block 504 involves analyzing an entire regulatory change documentation for descriptive fields to identify any coverage area indicator terms and/or phrases. As used herein, the term "descriptive fields" refers to portions of the regulatory change documentation that are known to include useful information in making regulatory change determinations, areas that are likely to include useful information in making regulatory change determinations, and/or any area of a regulatory change documentation where words, codes, and/or citations are identified by the system.

The system is analyzing the descriptive fields to identify coverage area indicator terms and phrases that will be useful in determining a relevance of each regulatory change documentation, both with respect to which regulatory inventory (ies) are affected by the regulatory change and with respect to a severity or potential severity associated with the regulatory change within that regulatory inventory and its associated line of business.

As used herein, the term "coverage area indicator terms and phrases" refer to words, terms, phrases, numeric codes, alphanumeric codes, symbols, indicia, icons, reference codes, or the like, whose presence or absence within a change reference documentation correlates in some manner to whether the regulatory change documentation is materially relevant to a particular line of business's regulatory inventory. For example, the presence of a particular regulatory section number within a regulatory change documentation positively correlates with a likelihood that this regulatory change documentation is associated with a change to that regulation, and therefore all business units that require regulatory compliance steps associated with that regulation are likely also affected by this regulatory change documentation. As such, this regulatory section number is considered a coverage area indicator term.

Likewise, if a particular term or phrase that is closely associated with regulations that affect a particular business unit is found within a regulatory change documentation, then that particular term or phrase is considered a coverage area indicator term or phrase. Furthermore, if an icon or image (e.g., an image of a regulatory body, an image of an official stamp or signature, or the like) that is closely associated with regulatory changes for at least one regulatory inventory of a line of business of the enterprise, then that icon or image is considered a coverage area indicator term or phrase.

In some embodiments, the certain terms or phrases are considered coverage area indicator terms or phrases only when they are identified in regulatory change documentation from one or more particular regulatory data sources. For example, a term associated with a taxation group of the managing entity may be highly relevant and therefore considered a coverage area indicator term or phrase for regulatory change documentation received from a taxation regulatory data source, but that same term may be considered to not be relevant (in either a positive or negative way) with regulatory change documentation received from a public relations regulatory data source.

Furthermore, each coverage area indicator term or phrase may be associated with a degree of likelihood that the regulatory change documentation is materially relevant to a particular line of business's regulatory inventory. Therefore, once all coverage area indicator terms or phrases are identified, an overall impact value of the regulatory change documentation can be assessed for each regulatory inventory of the enterprise (and their associated lines of business). Because information about the individual coverage area indicator terms or phrases are the basis of the overall impact value of the regulatory change documentation, each coverage area indicator term or phrase can be assigned and/or determined to have a sub-impact value within the regulatory change documentation. This sub-impact value can be different with respect to different regulatory inventories, and can even change based on its positioning within a regulatory change documentation. In some embodiments, relationships between two or more coverage area indicator terms or phrases have their own sub-impact value. These concepts are discussed in greater detail with respect to the machine learning system described in block 506.

Turning then to block 506 of the process 500, the system causes a dynamically updated machine learning system to determine an impact value of each identified regulatory change documentation for one or more regulatory inventories of the enterprise by analyzing the coverage area indicator terms and phrases within each regulatory change documentation.

The machine learning system may be the same or substantially similar to the machine learning system 140 of FIG. 1. The machine learning system may include a knowledge base (e.g., the historical regulatory change database 130 of FIG. 1, a set of user-determined coverage area indicator terms or phrases, or the like), a set of regulatory change documentation analysis rules (e.g., rules based on a learning classifier system, rules based on an association rule learning system, or the like), and any other sets of data, rules, guidelines, boundaries, and any other information that can be utilized to analyzed a regulatory change documentation as described herein.

The machine learning system may comprise a deep learning system like a deep neural network-based system in addition to other machine learning functions like decision tree and regression techniques. In some embodiments, this deep neural network may comprise 3, 4, or more layers, and may comprise one or more of an autoencoder, a multilayer perceptron ("MLP") a recurrent neural network ("RNN"), a convolutional deep neural network ("CNN"), a Boltzmann machine, and the like. In some embodiments, the machine learning system is a separate system from the managing entity system of the enterprise. However, in other embodiments, at least a portion of the machine learning system is a separate system that is controlled by or otherwise managed by the managing entity system.

The machine learning system may determine the impact value of each regulatory change documentation based no sub-impact values of individual coverage area indicator terms or phrases, or relationships between multiple coverage area indicator terms or phrases. The amount of each of these sub-impact values may be standard or set amounts that do not change. However, in other embodiments, the amount of one or more of each of these sub-impact values may adjust based on established or machine-learned rules or algorithms to be indicative of the likelihood that that presence and/or relationship of the associated coverage area indicator term or phrase means that the overall regulatory change documentation is materially relevant to a particular regulatory inventory of a line of business. Of course, the sub-impact value for a coverage area indicator term or phrase may also be different for different regulatory inventories, each associated with a different line of business.

As an example, the machine learning system may analyze the coverage area indicator terms and phrases from the descriptive fields and determine the sub-impact values based on the presence of each of the individual coverage area indicator terms and/or phrases. As described above, the mere presence of a particular word, phrase, marking, code, or the like may have a positive correlation with the overall regulatory change documentation being materially relevant to a particular art unit. However, the system may utilize the machine learning system's advanced and more complex analysis techniques to identify significances between multiple coverage area indicator terms or phrases and assign sub-impact values to those values.

In another example, the machine learning system may determine sub-impact values for the proximity levels between two or more specific coverage area indicator terms and/or phrases within a regulatory change documentation. This proximity determination may be a number of words or characters between a first and second (and/or third, fourth, or the like) coverage area indicator term or phrase within the regulatory change documentation. Additionally or alternatively, the proximity determination may be linear distance between multiple coverage area indicator terms or phrases (e.g., straight line distance). The significance of the proximity levels is that the degree of closeness between two or more coverage area indicator terms or phrases can have a positive correlation with the likelihood that the overall regulatory change documentation is materially relevant to a particular regulatory inventory of a line of business. As an example, the system may determine whether a particular word is found within three words of a particular phrase, and assign the sub-impact value to those terms.

The machine learning system may have a rule that the relationship between the multiple coverage area indicator terms or phrases must be in a particular order (e.g., the particular word first, then the particular phrase). Alternatively, the machine learning system may determine that a particular sub-impact value may be assigned to relationships of a first ordering of the coverage area indictor terms or phrases, but that a second, different sub-impact value is assigned to relationships of a second, different ordering of the coverage area indicator terms or phrases. In some embodiments, the machine learning system may determine that the ordering of the multiple coverage area indicator terms or phrases does not change the sub-impact value.

Additionally or alternatively, the machine learning system may determine sub-impact values that are based on grammatical relationships between two or more specific coverage area indicator terms and phrases. For example, the system may assign one sub-impact value if two coverage area indicator terms are found in a single regulatory change documentation, but then assign a different sub-impact value if one of those terms defines, describes, names, or otherwise adjusts the meaning of the other term. For example, the machine learning system may assign a higher sub-impact value (i.e., a value that causes the overall impact value to be more associated with being materially relevant to a regulatory inventory of a particular line of business) when the first term is used as an adjective of the other term, as opposed to simply being within five words of the other term.

In some embodiments, the machine learning system may determine sub-impact values for the regulatory change of time-based information associated with the identified regulatory change documentation. This time-based information may comprise a timing that a regulatory change is announced, a timing that the regulatory change documentation was received, a timing of when one or more portions of the regulatory change go into effect, a timing of when one or more compliance standards need to be implemented in response to the regulatory change, and/or the like. This information may be determined by the machine learning system.

Once the machine learning system has analyzed a regulatory change documentation to determine the sub-impact values for each identified coverage area indicator term or phrase, as well as the relationships between these terms or phrases, then the machine learning system aggregates these sub-impact values to calculate or otherwise determine the total impact value. In some embodiments, the machine learning system will simply add each of the identified sub-impact values to give the overall impact value. In other embodiments, the machine learning system will apply weightings to the sub-impact values of one or more of the coverage area indicator terms or phrases and then add these weighted sub-impact values to determine the overall impact value. In yet other embodiments, the machine learning system may input the identified sub-impact values (and/or weighted sub-impact values) into a determined (e.g., by a human specialist, by the machine learning system, or a combination of the two) algorithm that calculates the overall impact value of the regulatory change documentation. This algorithm may change over time as the machine learning system improves through using its knowledge base and testing results of the algorithm against gold standards set by human specialists over time.

In some embodiments, the machine learning algorithm is bypassed in response to a coverage area indicator term or phrase (and/or relationship) being at a particularly high or low (e.g., negative) sub-impact value. For example, the machine learning system may automatically set impact value for a regulatory change documentation at a value above a predetermined threshold in response to a particular sub-value being associated with regulatory change documentation that should always be transmitted to a regulatory inventory of a particular line of business. Alternatively, the machine learning system may automatically set the impact value for a regulatory change documentation at a value well below the predetermined threshold in response to a particular sub-value being associated with regulatory change documentation that should never be transmitted to a regulatory inventory of a particular line business.

By determining sub-impact values of complex relationships between multiple coverage area indicator terms or phrases within a regulatory change documentation, the machine learning system is able to determine the overall impact value of the regulatory change documentation in a more efficient manner than through human or general computing analysis, which is important in regulatory change management environments where the quick identification of material regulatory changes is vital to the timely establishment of adequate and proper compliance measures to adhere to the regulatory changes throughout an enterprise.

While in some embodiments the sub-impact values described above may be set or otherwise established by a specialist (e.g. a regulatory change management specialist of the enterprise), the machine learning system may be configured to adjust previous rules or algorithms for assigning the sub-impact values based on deep learning and analysis of historical change management data. In this way, the machine learning system can dynamically update over time as more information is introduced to its knowledge base (e.g., the historical regulatory change database).

The machine learning system can further utilize a deep neural network learning system to analyze the historical regulatory change database to identify new coverage area indicator terms and/or relationship between new and/or known coverage area indicator terms that correlate to a true positive of a regulatory change documentation that is associated with a regulatory change for a particular regulatory inventory. As new coverage area indicator terms and phrases are identified, and/or as their relationships and sub-impact values are defined or adjusted, the machine learning system can test these new rules against the historical regulatory change database and newly received regulatory change documentation before the new rules are put into a production environment.

In this way, the sub-impact values of (1) individual coverage area indicator terms and phrases, (2) proximity levels between two or more specific coverage area indicator terms and phrases, (3) grammatical relationships between two or more specific coverage area indicator terms and phrases, and (4) time-based information of regulatory change documentation can all be determined based on a machine learning analysis of historical regulatory change data that includes previously received regulatory change documentation and user-verified determinations as to whether the previously received regulatory change documentation was materially relevant to one or more regulatory inventories.

By dynamically updating this machine learning system, the overall system becomes more accurate and precise in its identification of relevant coverage area indicator terms or phrases, and their respective sub-impact values, over time, such that the overall impact value of a received regulatory change documentation is less likely to be incorrect than through standard or general stagnant systems. The resulting overall system is then less likely to miss-categorize a regulatory change documentation that should have been alerted to a regulatory inventory, while also minimizing alerting regulatory inventories with regulatory change documentation that is not actually materially relevant.

In some embodiments, the process 500 may also include block 508, where the system determines that an impact value of a regulatory change documentation meets or exceeds a predetermined threshold for a regulatory inventory of the enterprise. The predetermined threshold may be a pre-set (e.g., by a user and/or by the machine learning system), or otherwise determined (e.g., by a user and/or by the machine learning system) impact value amount that is at a level where the system is likely to catch all relevant regulatory change documentation with a minimum amount of false positive determinations. As such, this predetermined threshold may be adjusted over time based on subsequent review as to whether the predetermined threshold level was accurate and/or adequate in establishing a dividing line between regulatory change documentation that is not relevant or worth further analysis by a specialist and regulatory change documentation that is relevant and worth further analysis by the specialist.

In such embodiments, the process 500 then includes block 510, where the system causes a user dashboard associated with the regulatory inventory of the enterprise to display a regulatory change alert. The regulatory change alert may include any of the displays, notifications, user interface displays, and the like described with respect to FIGS. 6-10. Additionally or alternatively, the system may cause the workstation of a user associated with the line of business and related regulatory inventory that likely is affected by the regulatory change documentation to display the impact value of the regulatory change documentation, the sub-impact values of the coverage area indicator terms or phrases found within the regulatory change documentation, an explanation of each sub-impact value, the regulatory data source, timing information about the associated regulatory change, other affected business units, and the like.

Additionally or alternatively, the process 500 may include block 512, where the system determines that an impact value of a regulatory change documentation does not meet the predetermined threshold for the regulatory inventory of the enterprise. In such embodiments, the process 500 may then include block 514, where the system tags the regulatory change documentation as not being materially relevant to the regulatory inventory of the enterprise. In some embodiments, a user may review this categorization of the regulatory change documentation and either confirm or reverse the designation of being not materially relevant to the particular line of business. This determination can then be saved in the historical regulatory change database to improve the machine learning system's neural knowledge base, as the machine learning system can adjust its decision making and valuation of associated coverage area indicator terms or phrases based on this stored determination.

FIGS. 6-10 provide example screen shots of user interfaces for the user dashboard systems described herein, which present information about detected regulatory changes, time-based requirements for resolving such regulatory changes, information about why the system identified a regulatory change for a particular regulatory inventory, sources of determined regulatory change documentation, regulatory change documentation alerts, and the like.

FIG. 6 is an example screenshot of a regulatory inventory and regulatory change management user interface homepage 600 that may be provided by the system. The user interface includes a title 601, a list of available inventories 610, a list of selected inventories 620, a compliance status window 630, and a responses pending assessment window 640. The list of available inventories 610, as shown, includes the inventories for Line of Business 1, Line of Business 4, Line of Business 6, and Line of Business 7. The list of selected inventories 620, as shown, includes Line of Business 6. Since Line of Business 6 is the selected inventory, the user interface homepage 600 is populated with regulatory inventory and regulatory change data that pertains to Line of Business 6.

The compliance status window 630 may include an inventory classification dropdown menu 631, and a compliance status table 632 displaying the compliance status for all regulatory changes (and the respective compliance action plans) associated with the selected inventory classification. Example elements of the inventory classification dropdown menu include "all" (includes all inventory classifications within the selected inventory), "Region 1," "Region 4," "Process 1," "Process 4," and the like.

The compliance status table 632 may organize the compliance status of the compliance action plans into rows based on the impact rating of the respective regulatory change. The impact ratings shown in FIG. 6 include "High," "Medium," "Low," "Assessment Pending," "Needs Reassessment," and "Total," though other impact ratings may be used. The compliance status table 632 may also organize the compliance action plans into columns based on the timeline status of the compliance action plan. The timeline statuses shown in FIG. 6 include "On Target to Meet Deadline, "Deadline in Jeopardy," "Deadline Has Been or Will Be Missed," and "TBD/Unknown," though other timeline statuses may be used.

The responses pending assessment window 640 may list the regulatory changes identified by the system as potentially affecting the line of business selected (Line of Business 6, in the illustration). The regulatory changes may be organized by "Compliance Action Plan ID" (an identification number given to the compliance action plan), "Regulatory Change ID," "Title," "Issuing Authority," "Citation," "Assessment Due Date," "Days Until Assessment Due Date," "and Issue Date," though other elements may be used to organize the pending assessments to a regulatory change.

An example screenshot of the regulatory inventory tool 700 is illustrated in FIG. 7. The regulatory inventory tool 700 may include a title 701, subtitle 702, navigation bar 703, inventory dropdown menu 710, an inventory table 720, and a regulatory change table 730. The subtitle 702 may be the name of the inventory currently being reviewed. The navigation bar 703 may include links to a home page, links to administrators, a help link, a contact link, and the like. The inventory dropdown menu 710 may include a list of all inventories that the user 110 may want to access. As shown in FIG. 7, the line of business selected in the inventory dropdown menu 710 determines which inventory information populates the inventory table: since Line of Business 3 is selected in the inventory dropdown menu 710, the inventory table 720 is populated with information about the inventory associated with Line of Business 3.

The inventory table 720 may list all relevant laws, rules, and regulations associated with Line of Business 3 (or whichever line of business is selected in the inventory dropdown menu 710). This list may be organized by citation, rule standard name, associated action plans, issuing authority, and other descriptive information for the laws, rules, and regulations. The inventory table 720 may be filtered or searched so a user 110 may easily find relevant regulatory information regarding an aspect of their line of business. The inventory table 720 may include links that allow a user 110 to print or export, to an external spreadsheet application, all or part of the inventory table information, for further analysis and record keeping purposes.

The regulatory change table 730 may list the regulatory changes or additions to the regulatory inventory of the selected line of business (here, Line of Business 3). The regulatory change table 730 may include the same information as the inventory table, as well as a brief description of the regulatory change, an effective date of the regulatory change, and affected inventories. The regulatory change table 730 may include links that allow a user 110 to print or export, to an external spreadsheet application, all or part of the regulatory change table, for further analysis and record keeping purposes.

FIG. 8A and FIG. 8B illustrate screenshots of a regulatory change user interface 800. The general layout of a regulatory change user interface 800, as depicted, may include a title 801, a subtitle 802, a navigation bar 803, a regulatory change overview 810, and a regulatory change window 820. The title 801 may indicate that the user 110 is viewing a regulatory change user interface 800. The subtitle 802 may be the regulatory change ID given to the regulatory change by either the system or a user 110. The navigation bar 803 may provide links to the user 110 that allow the user to return to the homepage 600, see all regulatory changes, see the action steps pertaining to the current regulatory change, and contact an administrator. The regulatory change overview 810 may provide a short title for the regulatory change, a short title in the native language, the regulatory change ID, whether the regulatory change is applicable to the enterprise, the region affected by the regulatory change, the issuing authority, the type of issuance, the rule citation, the standard name for the rule citation, and the rule citation in the native language, though other elements may be added to provide a more comprehensive overview of the regulatory change.

The regulatory change window 820 may comprise of multiple tabs 821 that each contain information regarding the regulatory change at issue. As illustrated in the example screenshots, these tabs 821 may include "Responses," "Details," "Impacts," "Related Regulatory Changes," and "Regulatory Change History," though these are merely exemplary and other tabs may be used as well. The regulatory change window 820 may include links that allow a user to print some or all of the information on the screen, or to export some or all of a dataset to an external spreadsheet application.

FIG. 8A illustrates an example screenshot of a regulatory change user interface 800, with the "Details" tab selected in the regulatory change window 820. The "Details" tab may give an in-depth view of a selected regulatory change, with information being pulled from the feed, the questionnaire, and a regulatory inventory associated with the affected line of business. The information provided under the "Details" tab may include a full description of the regulatory change, the native language description of the regulatory change, a docket number, a citation for the regulatory change, an enterprise issuance category, and details about whether the regulatory change requires English translation, or was issued jointly with other laws. This description may help a user answer the questionnaire and better analyze the regulatory change and its impact on specific lines of business within the enterprise.

FIG. 8B illustrates an example screenshot of a regulatory change user interface 800 with the "Responses" tab selected in the regulatory change window 820. The "Responses" tab may list the compliance action plans for each line of business affected by the regulatory change. As illustrated in FIG. 8B, the regulatory change user interface 800 may organize the compliance action plans based on impact rating, compliance status, regulatory inventory, date created, anticipated completion date, and response ID (created either by the system or a user 110 when the user completes the questionnaire and the compliance action plan is created). Of course, these are merely examples of compliance action plan characteristics that may be used for organizational purposes and other characteristics may be used as well.

FIG. 9 illustrates a screenshot of a questionnaire interface 900, according to one embodiment of the invention. The questionnaire interface 900 may comprise a title 901, a subtitle 902, a navigation bar 903, an impact assessment rating dropdown menu 910, a compliance status dropdown menu 920, and a list of compliance impact assessment questions 930. The title 901 may indicate to a user 110 that the user 110 is viewing the questionnaire interface 900. The subtitle 902 may be the title, ID number, or record number of the compliance action plan, which may not be fully created yet. Note that the terms "compliance action plan" and "inventory response" are synonymous, and any reference to a response to a regulatory change is equivalent to a compliance action plan. The impact assessment rating 910, the compliance status 920, and the compliance impact assessment questions 930, together, comprise the questionnaire discussed with respect to the process 400 described in FIG. 4.

The impact assessment rating dropdown menu 910 allows a user 110 to select the appropriate impact rating for the regulatory change, relative to the specific line of business and its regulatory inventory that is being analyzed. Examples of impact ratings for the regulatory change include "High," "Medium," "Low," "Assessment Pending" (to be used when the user 110 needs more information before making a decision), "Reassess" (to be used when an error may have occurred or new changes may have affected a previous determination), and the like. As described earlier, the user 110 may reach the impact assessment decision based on the information provided in the regulatory change user interface 800, the answers to the impact assessment questions 930, and the user's 110 own knowledge and skill regarding the line of business being analyzed.

The compliance status dropdown menu 920 allows a user 110 to select the appropriate compliance status for achieving compliance within the analyzed line of business for the regulatory change at issue. Examples of a compliance status include "On Target to Meet Deadline," "Deadline in Jeopardy," "Deadline Has Been or Will Be Missed," "TBD/Unknown" (to be used when the user 110 needs more information before making a decision), and the like. The user 110 may reach the compliance status determination based on the information provided in the regulatory change user interface 800, the answers to the impact assessment questions 930, and the user's 110 own knowledge and skill regarding the line of business being analyzed.

The compliance impact assessment questions 930 may be presented in list-form, as illustrated in FIG. 9. A header 931 may describe how many questions out of the total number of questions remain, and provide links that a user may select to answer "Yes" or "No" to all applicable questions. The compliance impact assessment questions 930 may be organized by the categories of "Framework Element" (an aspect of the line of business), "Question," "Impact?," "Related Data," "Add Data," "Selected Data," "Add Comment," and "Add Action Step," among other potential categories. As illustrated in FIG. 9, the "Framework Elements" may include "Strategic Plan," "Regulatory Inventory," "Policy," "Monitoring," "Testing," among other potential aspects of a line of business. The "Questions" may be general questions such as "Does a Strategic Plan need to be updated or created because of this regulatory change?" but the questions could also be more specific and ask for analysis of a particular component of the framework element. The "Impact" may be a general "yes" or "no" selectable response, as illustrated, but a more detailed response may be used as well. The "Related Data" column may provide relevant data concerning the regulatory change and/or the particular line of business. The "Add Data" may provide a link or comment space to allow a user 110 to add relevant data to the compliance impact assessment questions 930. The "Selected Data" column may provide a list of data currently selected for review by the user 110. The "Add Comment" column may provide a link or comment space to allow a user 110 to attach a comment to the questionnaire for future reference. The "Add Action Step" column may provide a link or comment space for the user 110 to create an action step that will become a part of the compliance action plan for the line of business associated with the regulatory change. The system may require all questions within the questionnaire 910-630 to be completed by the user 110 before the system will receiving the questionnaire answers and begin to create a compliance action plan for the regulatory change.

FIG. 10 illustrates a sample display of a compliance action plan interface 1000, according to one embodiment of the invention. The compliance action plan interface 1000, as illustrated, includes a title 1001, an action step list 1010, and an impact assessment section 1020. The title 1001 may indicate to a user 110 that the user 110 is viewing a compliance action plan interface. The action step list 1010 may be populated with every action step that comprises the compliance action plan. The action step list 1010 may be organized with the following columns: "Compliance Status," "Framework Element," "Selected Data," "Action Category," "Action Commentary," and "Target Date," though other columns may be provided as well. The action step list 1010 may also have a link that removes an action step from the action step list 1010, when selected. The terms that populate the "Compliance Status" column may include "On Target to Meet Deadline," "Deadline in Jeopardy," "Deadline Has Been or Will Be Missed," and "TBD/Unknown." The "Framework Elements" may include "Strategic Plan," "Regulatory Inventory," "Policy," "Monitoring," "Testing," among other potential aspects of a line of business. The "Selected Data" may be data that was previously selected by the user 110 when filling out the questionnaire, and may aid the enterprise in completing the action step. The "Action Category" may be a type of action step regarding the framework element, such as "Review," "Create New," "Reconfigure," "Issue Memo," and the like. The "Action Commentary" may be a description of the action step that details and/or clarifies the actions necessary to satisfy the action step. This "Action Commentary" may be automatically populated with pre-programed language by the system, or may be populated by a user 110 during the questionnaire stage. The "Target Date" is the date set by either the system or a user 110 by which the action step should be completed in order for the compliance action plan to be completed by or before the regulatory change goes into effect. This date may be changed depending on when other action steps are completed. As action steps are completed, the system (or a user 110) may remove the action steps from the compliance action plan. In some embodiments, the action steps are left in the action step list 1010 so that a user 110 or administrator may review which steps are complete.

The impact assessment section 1020 may be comprised of an Anticipated Compliance Date 1021, Executive Comments 1022, an Internal/External dropdown menu 1023, and an Internal/External Description 1024. The Anticipated Compliance Date 1021 is the date by which the compliance action plan is expected to be completed. This date may be automatically assigned by the system by determining when the final action step is scheduled to be completed, or a user 110 may assign this date. The Executive Comments 1022 may be comments by a user 110, an administrator, or anyone associated with the enterprise and may provide instructions, clarification, or notes about the compliance action plan. The Internal/External dropdown menu indicates whether the compliance action plan will be completed internally or if it should be (or already is) completed externally by an external party. The Internal/External Description provides instructions, clarifications, or notes about the internal/external nature of the compliance action plan.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise. In this regard, the term "processor" and "processing device" are terms that are intended to be used interchangeably herein and features and functionality assigned to a processor or processing device of one embodiment are intended to be applicable to or utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

The invention claimed is:

1. A system for dynamic regulatory change management for an enterprise, said system comprising:
   a memory device; and
   a processing device operatively coupled to the memory device, wherein the processing device is configured to execute computer-readable program code to:
      continuously monitor a plurality of regulatory data sources to identify regulatory change documentation;
      scan descriptive fields within each identified regulatory change documentation for coverage area indicator terms and phrases;
      cause a machine learning system to determine an impact value of each identified regulatory change documentation for one or more regulatory inventories of the enterprise by analyzing the coverage area indicator terms and phrases within each regulatory change documentation;
      in response to determining that an impact value of a first regulatory change documentation for a first regulatory inventory meets or exceeds a predetermined threshold, cause a user dashboard associated with the first regulatory inventory to display a regulatory change alert for the first regulatory change documentation; or
      in response to determining that the impact value of the first regulatory change documentation for the first regulatory inventory is below the predetermined threshold, tag the first regulatory change documentation as not being materially relevant to the first regulatory inventory,
      wherein the impact values are determined and dynamically updated based on sub-impact values of (1) individual coverage area indicator terms and phrases, (2) proximity levels between two or more specific coverage area indicator terms and phrases, (3) grammatical relationships between two or more specific coverage area indicator terms and phrases, and (4) time-based information, wherein the time-based information comprises at least a timing that a regulatory change is announced, a timing that the regulatory change documentation was received, a timing of when one or more portions of the regulatory change go into effect, and a timing of when one or more compliance standards need to be implemented in response to the regulatory change, which are determined based on a machine learning analysis of a continuously updated historical regulatory change database comprising previously received regulatory change documentation and user-verified determinations as to whether the previously received regulatory change documentation was materially relevant to one or more regulatory inventories.

2. The system of claim 1, wherein the regulatory data sources comprise one or more electronic data feeds that monitor issuing authorities.

3. The system of claim 1, wherein the regulatory data sources comprise public information space systems that include regulatory information.

4. The system of claim 1, wherein analyzing the coverage area indicator terms and phrases within each regulatory change documentation is conducted based on:
   sub-impact values of individual coverage area indicator terms and phrases within each regulatory change documentation.

5. The system of claim 1, wherein analyzing the coverage area indicator terms and phrases within each regulatory change documentation is conducted based on:
   sub-impact values of proximity levels between two or more specific coverage area indicator terms and phrases within each regulatory change documentation.

6. The system of claim 1, wherein analyzing the coverage area indicator terms and phrases within each regulatory change documentation is conducted based on:
   sub-impact values of grammatical relationships between two or more specific coverage area indicator terms and phrases.

7. The system of claim 1, wherein analyzing the coverage area indicator terms and phrases within each regulatory change documentation is conducted based on:
   sub-impact values of time-based information associated with the identified regulatory change documentation.

8. The system of claim 1, wherein the displayed regulatory change alert comprises one or more of:
   the impact value of the first regulatory change documentation;
   the first regulatory change documentation;

individual regulatory coverage area indicator terms and phrases within the first regulatory change documentation;

sub-impact values of individual coverage area indicator terms and phrases within each regulatory change documentation; and time-based information associated with the identified regulatory change documentation.

9. A computer program product for dynamic regulatory change management for an enterprise, the computer program product comprising at least one non-transitory computer readable medium comprising computer readable instructions, the instructions comprising instructions for:

continuously monitoring a plurality of regulatory data sources to identify regulatory change documentation;

scanning descriptive fields within each identified regulatory change documentation for coverage area indicator terms and phrases;

causing a machine learning system to determine an impact value of each identified regulatory change documentation for one or more regulatory inventories of the enterprise by analyzing the coverage area indicator terms and phrases within each regulatory change documentation;

in response to determining that an impact value of a first regulatory change documentation for a first regulatory inventory meets or exceeds a predetermined threshold, causing a user dashboard associated with the first regulatory inventory to display a regulatory change alert for the first regulatory change documentation; or in response to determining that the impact value of the first regulatory change documentation for the first regulatory inventory is below the predetermined threshold, tagging the first regulatory change documentation as not being materially relevant to the first regulatory inventory, wherein the impact values are determined and dynamically updated based on sub-impact values of (1) individual coverage area indicator terms and phrases, (2) proximity levels between two or more specific coverage area indicator terms and phrases, (3) grammatical relationships between two or more specific coverage area indicator terms and phrases, and (4) time-based information, wherein the time-based information comprises at least a timing that a regulatory change is announced, a timing that the regulatory change documentation was received, a timing of when one or more portions of the regulatory change go into effect, and a timing of when one or more compliance standards need to be implemented in response to the regulatory change, which are determined based on a machine learning analysis of a continuously updated historical regulatory change database comprising previously received regulatory change documentation and user-verified determinations as to whether the previously received regulatory change documentation was materially relevant to one or more regulatory inventories.

10. The computer program product of claim 9, wherein the regulatory data sources comprise one or more electronic data feeds that monitor issuing authorities.

11. The computer program product of claim 9, wherein the regulatory data sources comprise public information space systems that include regulatory information.

12. The computer program product of claim 9, wherein analyzing the coverage area indicator terms and phrases within each regulatory change documentation is conducted based on:

sub-impact values of individual coverage area indicator terms and phrases within each regulatory change documentation.

13. The computer program product of claim 9, wherein analyzing the coverage area indicator terms and phrases within each regulatory change documentation is conducted based on:

sub-impact values of proximity levels between two or more specific coverage area indicator terms and phrases within each regulatory change documentation.

14. The computer program product of claim 9, wherein analyzing the coverage area indicator terms and phrases within each regulatory change documentation is conducted based on:

sub-impact values of grammatical relationships between two or more specific coverage area indicator terms and phrases.

15. The computer program product of claim 9, wherein analyzing the coverage area indicator terms and phrases within each regulatory change documentation is conducted based on:

sub-impact values of time-based information associated with the identified regulatory change documentation.

16. The computer program product of claim 9, wherein the displayed regulatory change alert comprises one or more of:

the impact value of the first regulatory change documentation;

the first regulatory change documentation;

individual regulatory coverage area indicator terms and phrases within the first regulatory change documentation;

sub-impact values of individual coverage area indicator terms and phrases within each regulatory change documentation; and time-based information associated with the identified regulatory change documentation.

17. A computer implemented method for dynamic regulatory change management for an enterprise, said computer implemented method comprising:

providing a computing system comprising a computer processing device and a non-transitory computer readable medium, where the computer readable medium comprises configured computer program instruction code, such that when said instruction code is operated by said computer processing device, said computer processing device performs the following operations:

continuously monitoring a plurality of regulatory data sources to identify regulatory change documentation;

scanning descriptive fields within each identified regulatory change documentation for coverage area indicator terms and phrases;

causing a machine learning system to determine an impact value of each identified regulatory change documentation for one or more regulatory inventories of the enterprise by analyzing the coverage area indicator terms and phrases within each regulatory change documentation;

in response to determining that an impact value of a first regulatory change documentation for a first regulatory inventory meets or exceeds a predetermined threshold, causing a user dashboard associated with the first regulatory inventory to display a regulatory change alert for the first regulatory change documentation; or in response to determining that the impact value of the first regulatory change documentation for the first regulatory inventory is below the predetermined threshold, tagging the first regulatory change documentation as not being materially relevant to the first regulatory inventory, wherein the impact values are determined and dynamically updated based on sub-impact values of (1) individual coverage area indicator terms and phrases, (2) proximity levels between two or more specific coverage area indicator terms and phrases, (3) grammatical relationships between two or more specific coverage area indicator terms and phrases, and (4) time-based information, wherein the time-based information comprises at least a timing that a regulatory change is announced, a timing that the regulatory change documentation was received, a timing of when one or more portions of the regulatory change go into effect, and a timing of when one or more compliance standards need to be implemented in response to the regulatory change, which are determined based on a machine learning analysis of a continuously updated historical regulatory change database comprising previously received regulatory change documentation and user-verified determinations as to whether the previously received regulatory change documentation was materially relevant to one or more regulatory inventories.

18. The computer implemented method of claim 17, wherein the regulatory data sources comprise one or more electronic data feeds that monitor issuing authorities.

19. The computer implemented method of claim 17, wherein the regulatory data sources comprise public information space systems that include regulatory information.

20. The computer implemented method of claim 17, wherein analyzing the coverage area indicator terms and phrases within each regulatory change documentation is conducted based on:

sub-impact values of individual coverage area indicator terms and phrases within each regulatory change documentation.

* * * * *